(12) United States Patent
Sasaki et al.

(10) Patent No.: US 6,445,548 B1
(45) Date of Patent: Sep. 3, 2002

(54) DISK APPARATUS HAVING A LATCH MECHANISM FOR HOLDING THE ACTUATOR ARM DURING NON-OPERATION

(75) Inventors: Tsutomu Sasaki, Yamato; Satoshi Oikawa, Zama; Toshiaki Otsuka, Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/523,845

(22) Filed: Mar. 13, 2000

(30) Foreign Application Priority Data

Jul. 15, 1999 (JP) .......................................... 11-201192

(51) Int. Cl.[7] ................................................ G11B 5/54
(52) U.S. Cl. .................................................. 360/256.2
(58) Field of Search ...................................... 360/256.2

(56) References Cited

U.S. PATENT DOCUMENTS 5,541,792 A * 7/1996 Kinoshita ................... 360/105
5,581,424 A * 12/1996 Dunfield ..................... 360/105

* cited by examiner

Primary Examiner—A. J. Heinz
(74) Attorney, Agent, or Firm—Greer, Burns & Crain, LTD

(57) ABSTRACT

A disk apparatus has a rotatable actuator adapted to magnetically latch in a predetermined stop position when the disk apparatus is not operating. The actuator rotates about a rotating or swinging shaft and includes a coil arm having a latch magnet. The coil arm is adapted to pass between opposing permanent magnets when the actuator rotates about the rotating or swinging shaft. When the actuator is in the stop position, the latch magnet is outside of the area between the permanent magnets, therefore generating a repulsive force between the latch magnet and permanent magnets, inducing the actuator to magnetically latch. When the disk apparatus is operating, the latch magnet travels between the permanent magnets, resulting in opposing repulsive magnetic forces having equal magnitudes which cancel each other, maintaining the actuator's attitude without rotating it. In this manner, the latch magnet does not interfere with the operation of the actuator, and locks the actuator in a stop or park condition when the disk apparatus is not operating.

13 Claims, 8 Drawing Sheets

DISK APPARATUS HAVING A LATCH MECHANISM FOR HOLDING THE ACTUATOR ARM DURING NON-OPERATION

The present invention generally relates to an actuator arm adapted to drive a head in a disk apparatus, and more particularly, to a latch mechanism adapted to hold the actuator arm in a predetermined position during non-operation of the disk apparatus.

BACKGROUND OF THE INVENTION

A disk apparatus for recording and reproducing information to or from a disk medium must to avoid wear which results from contact between the head slider and the disk surface. Therefore, a contact-start-stop (CSS) system is employed in which, during non-operation of the disk apparatus, the head is in contact with the disk surface, and during operation of the disk apparatus, namely, during recording or reproducing operations, the head floats above the rotating disk surface.

In a disk apparatus employing the CSS system, the head slider includes a head element to record or reproduce information to or from a disk which floats away from the rotating disk surface during operation of the disk drive by receiving air flow generated by rotation of the disk. When information is recorded or reproduced, the head slider moves while floating above the rotating disk surface and is then placed over a predetermined track of the disk. When the disk apparatus is in the non-operating condition, the head slider is placed within the CSS zone provided on the disk surface. Moreover, when the disk apparatus is in the non-operating condition, since the disk is not rotating, air flow for floating the head slider is not generated and the head slider is in contact with the CSS zone.

If the disk apparatus receives a shock when the head slider is in contact with the CSS zone, the head slider may move to the data zone and cause damage, namely, a destruction of data or a disabling of the data reading or writing operation. In recent years, with reduction of size, such a disk apparatus has been used in portable devices such as note-sized personal computers. Such a disk apparatus is often placed in a condition where it may easily receive an external shock. Therefore, high durability against shock is one of the performance characteristics required for a disk apparatus.

Therefore, a latch mechanism has been provided so that the actuator is fixed in the stop position when the disk apparatus is in the non-operating condition. By providing the latch mechanism, if the disk apparatus receives a certain degree of shock, the head slider does not move to the data zone and thereby the disk and data can be protected.

FIGS. 1(a) and 1(b) illustrate a structure of the latch mechanism of the related art. A voice coil 51 is mounted at the rear end surface of an actuator 22 which supports a head slider 4,. The voice coil 51 is placed within magnetic fields generated by an upper permanent magnet 54 provided at the lower surface of an upper yoke 52, and a lower permanent magnet 55 provided at the upper surface of lower yoke 53. A voice coil motor (VCM) 23 which rotates the actuator 22 includes the voice coil 51, upper and lower yokes 52, 53 and permanent magnets 54, 55 or the like.

A latch magnet 11 is provided in the area outside the magnetic field of the rear end surface of the actuator 22. Moreover, opposing dowels 12 are provided which sandwich the plane of motion of the latch magnet 11. The dowels are located at the lower surface of upper yoke 52 and at the upper surface of the lower yoke 53. The dowels 12 are generally formed by pressing the yokes 52, 53.

According to this structure, when the head slider 4 stops in a CSS zone 31 of a disk 1, the latch magnet 11 is proximal to the dowels 12 and magnetic force attracts the latch magnet 11 toward the dowels 12. As a result, a counterclockwise torque is generated in the actuator 22 and thereby the actuator 22 is energized or biased in the counterclockwise direction. Therefore, when the head slider 4 receives a shock when it is in contact with the CSS zone 31, it is prevented from moving to data zone 32.

In order to realize a highly reliable latch mechanism, the actuator 22 must be energized or biased toward the CSS zone 31 by an intensive torque. In the latch mechanism illustrated in FIG. 1, the magnetic force of latch magnet 11 must be intensified to attain a strong latch force. However, when the magnetic force of the latch magnet 11 is raised, a significant attracting force is generated between the dowels 12 and the latch magnet 11 even during seek operations, resulting in an influence on the seek control. As a result, the seek control becomes difficult and the processing speed is decreased. Moreover, when an intensified magnetic force of the latch magnet 11 is required, it also requires enlargement of the latch magnet 11. Since the latch magnet 11 illustrated in FIG. 1 is provided at the far end of the rotating shaft of the actuator 22, enlargement of latch magnet 11 requires a large rotating inertia of the actuator 22 to release the latch. Thereby, the load on VCM 23 becomes large and power consumption also becomes large.

As a solution to the problems explained above, a latch mechanism utilizing a solenoid and a mechanical latch mechanism utilizing air pressure generated by rotation of the disk medium have been proposed, but these mechanisms require the addition of expensive parts, thereby increasing cost.

It is therefore a first object of the present invention to improve the shock resistance of a disk apparatus.

It is a second object of the present invention to provide a disk apparatus which assures high speed operation.

It is a third object of the present invention to provide a low cost disk apparatus.

It is a fourth object of the present invention to provide a latch mechanism having a simplified structure.

It is a fifth object of the present invention to provide a latch mechanism having a large latching force.

SUMMARY OF THE INVENTION

In a latch mechanism used for a disk apparatus of the present invention, a latch force is obtained from a latch magnet attached to an actuator. The latch magnet passes through a magnetic field generated by two permanent magnets of a voice coil motor (VCM), with a rotating or swinging shaft of the actuator defining a center of rotation. According to this structure, a magnetic force in the rotating direction of the actuator can be generated between the latch magnet and the permanent magnets of the VCM when the actuator is in certain locations. The magnetic force working on the permanent magnets is higher than the magnetic force working between the metal piece and magnet of the related art. Therefore, an intensive latch force can be obtained from this magnetic force to improve the shock resistance of the disk apparatus. In addition, the latch mechanism has a simplified structure which does not require additional parts and therefore a low cost disk apparatus can be realized. Moreover, the latch magnet can be located proximal to the rotating shaft of the actuator, thereby decreasing the rotational inertia of the actuator. Accordingly, the load required for the VCM drive the actuator is alleviated to realize reduction of power consumption and high speed seeking.

Moreover, when the direction of the magnetic flux of the latch magnet is parallel to the direction of the magnetic flux generated by the permanent magnets of the VCM, and the head slider is resting on the CSS zone, it is preferable that the latch magnet be placed at least partially outside of the magnetic field of the permanent magnets. According to this structure, when the disk is in the non-operating condition and a latching of the actuator is required, a magnetic force in the direction of rotation of the actuator is generated between the latch magnet and the permanent magnets, and an intensive latch force can be obtained from this lateral magnetic force.

Moreover, when the head slider is located at a position furthest from the CSS zone in the movable range of the actuator, it is preferable for the latch magnet to be placed in the magnetic field of the permanent magnets. According to this structure, a magnetic force is not generated between the permanent magnets and the latch magnet during the seek operation, and therefore such a magnetic force does not influence the seek control. Therefore, high speed seek control may be realized.

BRIEF DESCRIPTION OF THE DRAWINGS

The above mentioned and other features of this invention and the manner of obtaining them will become more apparent, and the invention itself will be best understood with reference to the following description of an embodiment of the invention taken in conjunction with the accompanying drawings, in which.

DETAILED DESCRIPTION OF THE INVENTION

Figure 1A:
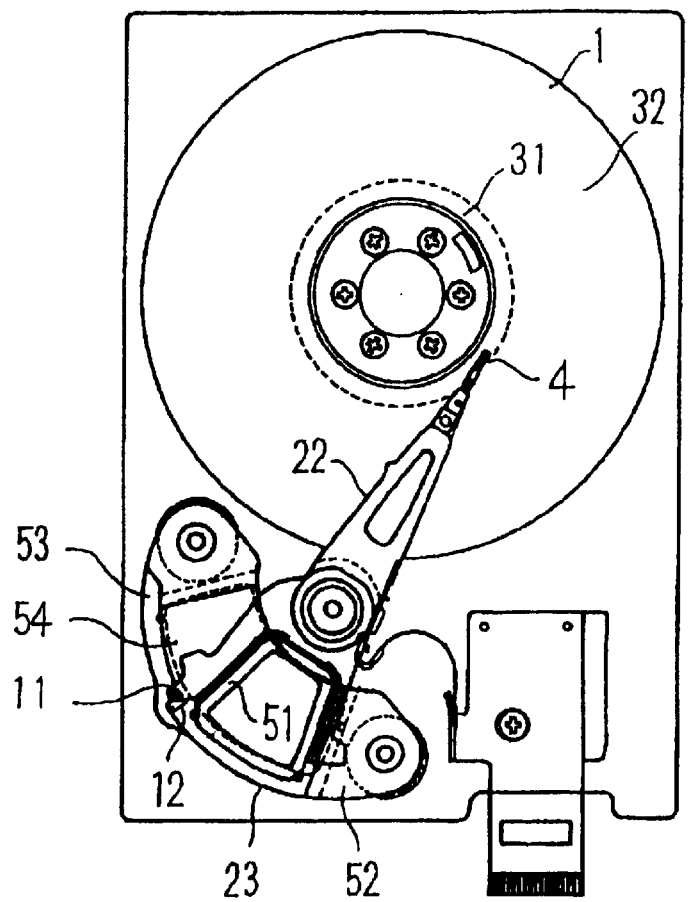
FIG. 1(a) is a plan view of a magnetic disk apparatus of the prior art.
Figure 1B:
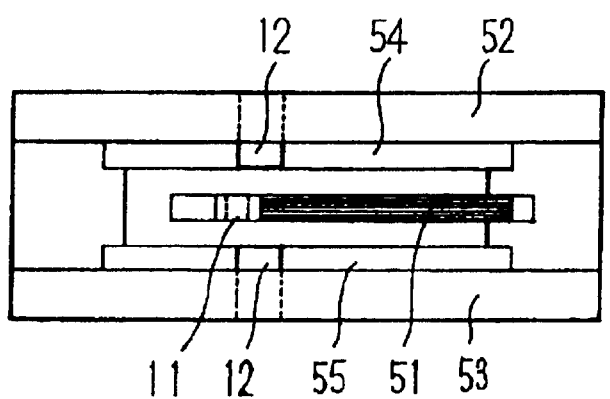
FIG. 1(b) is a back side view of a VCM of the prior art.
Figure 2A:
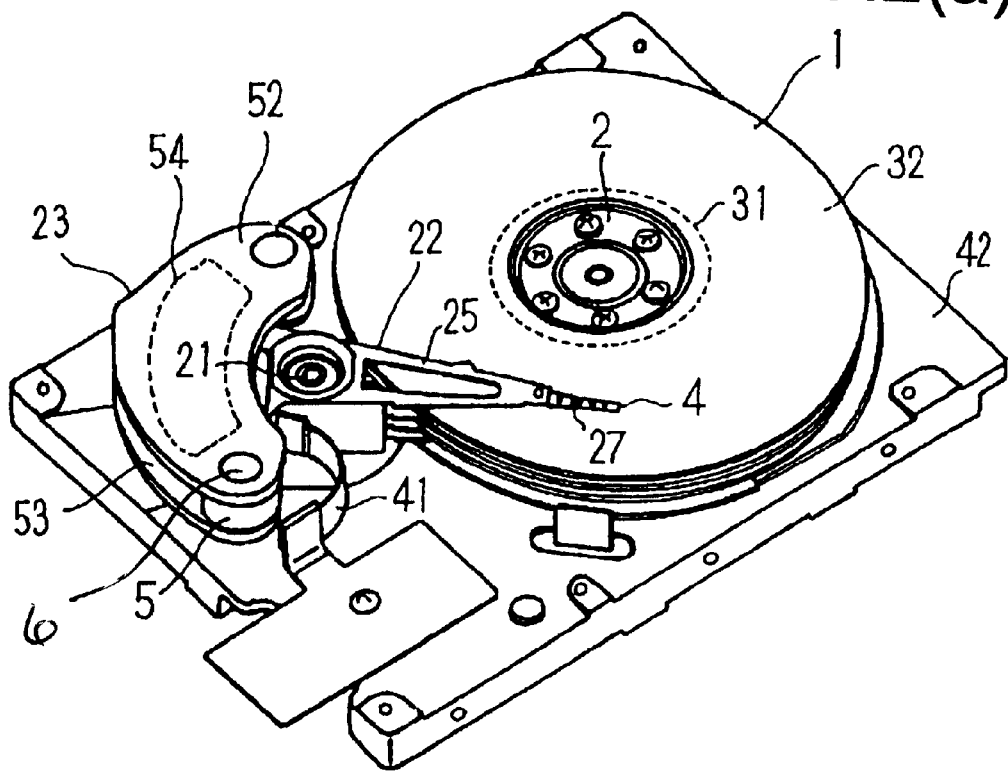
FIG. 2(a) is a perspective view of a disk drive which has a first embodiment of the present invention.
Figure 2B:
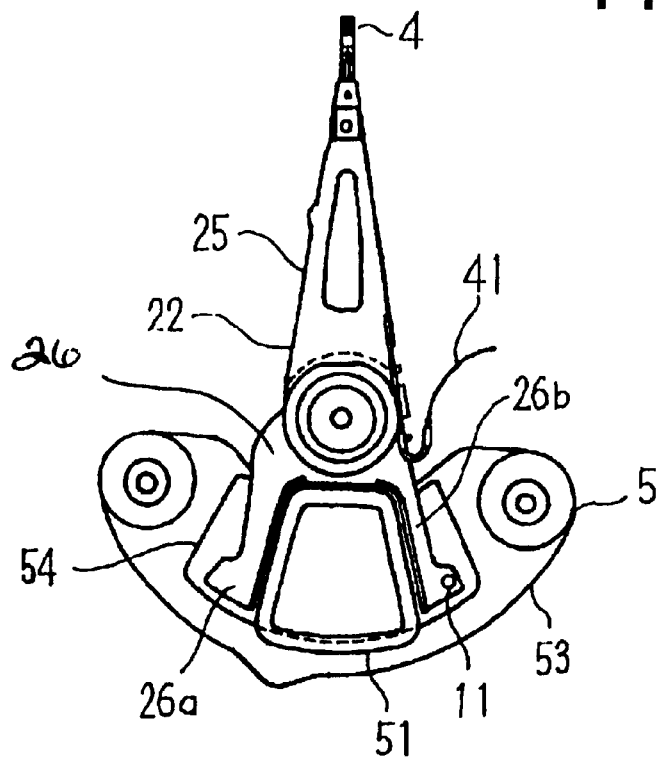
FIG. 2(b) is a plan view of the actuator illustrated in FIG. 2(a)

FIGS. 2(a) and 2(b) illustrate a disk drive of the first embodiment of the present invention. FIG. 2(a) is a perspective view of a disk drive in the condition that the cover (not illustrated) is removed, and FIG. 2(b) is a plan view of an actuator.

The disk drive illustrated in FIGS. 2(a) and 2(b) includes, within an enclosure consisting of a cover (not illustrated) and a base 42, a disk 1 such as a magnetic disk or the like as the data recording medium, a spindle motor 2 to drive the disk 1 to rotate, an actuator 22 on which a head slider 4 is mounted, and a voice coil motor (VCM) 23 to drive the actuator 22 to swing back and forth around an axis.

The disk 1 is fixed to a rotor of the spindle motor 2. When the disk drive is operating, the disk 1 is driven to rotate around the spindle shaft of the spindle motor 2, and is also driven to stop when the disk drive is in non-operating condition. On the surface of the disk 1, a data zone 32 where the tracks on which data and servo information are recorded are arranged concentrically, and a stop area or CSS zone 31 in which the head slider 4 is placed when the disk drive is in the non-operating condition are provided. Here, the CSS zone 31 is provided at the internal circumference of the disk 1, but it may also be provided at the external circumference. In this embodiment, three disks are mounted, but the number of disks to be mounted is not limited thereto.

The actuator 22 is formed of aluminum and is provided with a head arm 25 and a coil arm 26. The actuator 22 is engaged with a rotating or swinging shaft 21 and is adapted to freely swing, namely, the actuator 22 can rotate about the rotating or swinging shaft 21. The head arm 25 and coil arm 26 are arranged respectively on opposite sides of the rotating or swinging shaft 21. Here, the coil arm 26 and head arm 25 are integrated at the time of formation.

The coil arm 26 is composed of an outer arm 26(b) and an inner arm 26(a).

At the end portion of head arm 25, a suspension 27 is mounted to give a spring pressure to the head slider 4.

The head slider 4 is provided opposed to a surface of the disk 1 and is connected to control means (not illustrated) with a head wire 41 or the like. The head slider 4 records the data supplied from the control means (not illustrated) to the tracks on the surface of disk 1, and is also provided with a head element (not illustrated) to read the data recorded in the tracks and then send this data to the control means (not illustrated). When the disk drive is not in operation, the head slider 4 is in contact with the CSS zone 31 provided on the inner area of disk 1. When the disk drive is in the operating condition, the head slider 4 floats above on the surface of the rotating disk 1. Usually, a head slider is provided for each surface of each disk, and the head sliders move in unison.

The VCM 23 is composed of a voice coil 51 mounted on the coil arm 26, an upper yoke 52 and a lower yoke 53, a permanent magnet 54 deposited at the lower surface of the upper yoke 52, and a permanent magnet 55 deposited on the upper surface of the lower yoke 53. To the voice coil 51, a drive current is supplied from the control means (not illustrated). The coil arm 26 is arranged in the space between by the upper yoke 52 and the lower yoke 53. In this embodiment, a permanent magnet is provided for both the upper and the lower yokes 52, 53, but a permanent magnet may be provided to only one of them.

A stopper 5 is provided around a pole 6 provided between the upper yoke 52 and the lower yoke 53. The stopper 5 is formed of an elastic material. If for any reason the VCM 23 operates uncontrollably during operation, the coil arm 26 contacts the stopper 5 to forcibly stop the swinging operation of the actuator 22. With the stopper 5, the actuator 22 is protected from collision with the spindle motor 2 and the other mechanisms forming the apparatus.

As illustrated in FIG. 2(b), the outer arm 26b of the coil arm 26 of the X actuator 22 includes a latch magnet 11. The latch magnet 11 has a circular shape and is located in a hole provided in the outer arm 26b and is also fixed by a bonding agent. The latch magnet 11 has a diameter of 1.5 mm and a height of 1.2 mm and also has a magnetic flux which is inverted in relation to the magnetic field generated by the permanent magnets 54, 55.

Figure 3A:
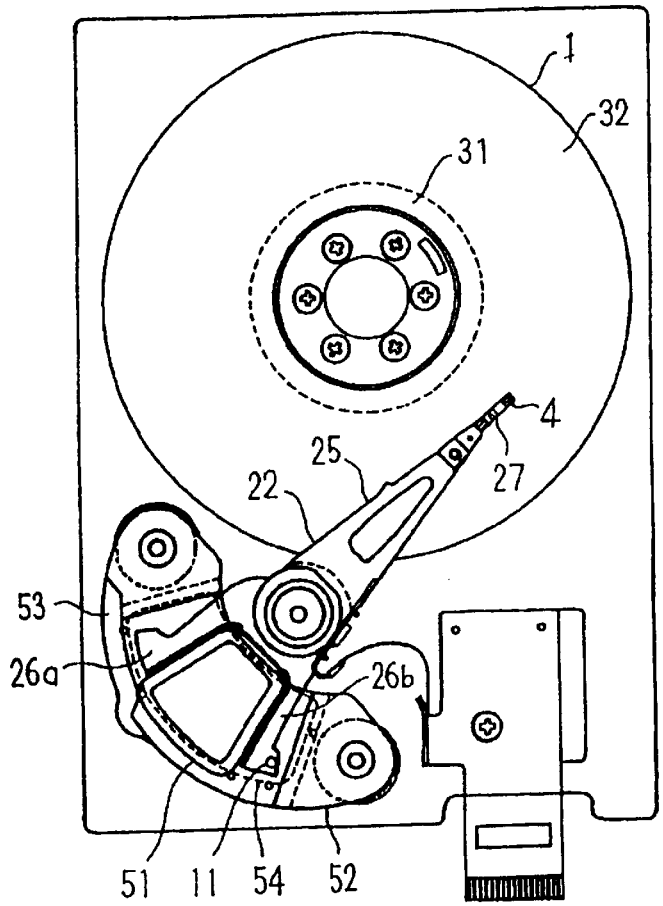
FIG. 3(a) is a plan view of the disk apparatus of FIG. 2(a) in an operating condition.
Figure 3B:
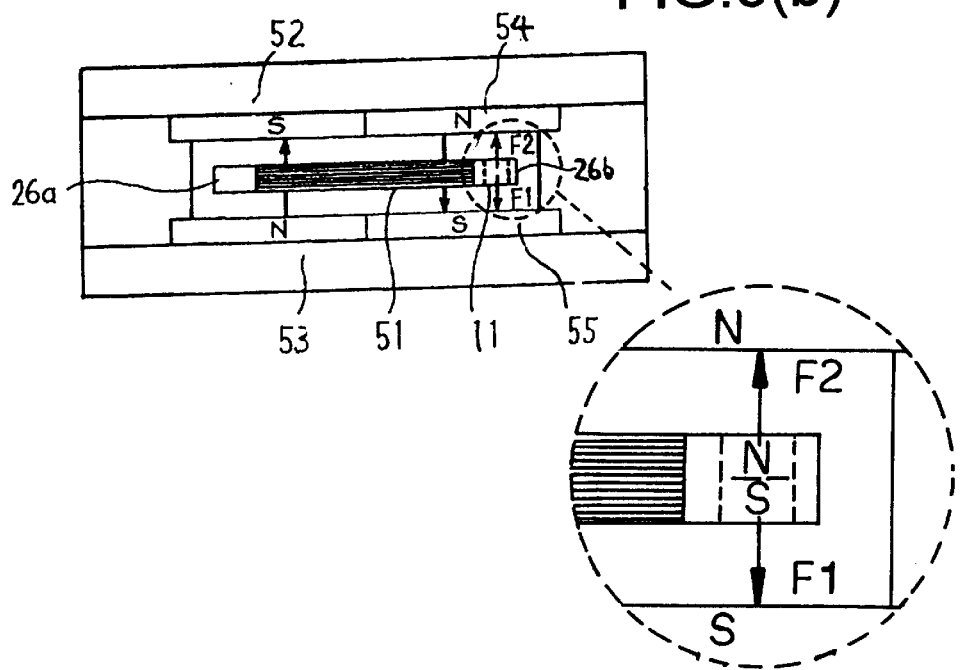
FIG. 3(b) is a back-side view of the VCM illustrated in FIG. 3(a)

FIGS. 3(a), 3(b), 4(a) and 4(b) and FIG. 4 illustrate the operation of the actuator of the present invention. In FIGS. 3(a) and 3(b), the disk drive is in the operating condition, while in FIGS. 4(a) and 4(b), the disk drive is in the non-operating condition.

First, operation of the actuator 22 when the disk drive is in the operating condition will be explained.

As FIG. 3(a) illustrates, when the disk drive is in the operating condition, the head slider 4 mounted to the surface of the head suspension 27 opposing the disk 1 is located at a position within the data zone 32 of the disk 1. The head element (not illustrated) mounted on the head slider 4 performs the data recording and reproducing operation to and from the tracks of the data zone 32. Moreover, the head slider 4 floats above the surface of the disk 1 by receiving air flow generated when the disk 1 rotates. In this case, the latch magnet 11 is placed in the area between the permanent magnets 54, 55 as illustrated in FIG. 3(b). In the present embodiment, the movable range of the actuator 22 is set so that the latch magnet 11 does not enter the area between the permanent magnets 54, 55, where upper permanent magnet 54 is polarized to S pole and the lower permanent magnet 55 to N pole. The direction of the magnetic flux in the latch magnet 11 is the same as the direction of magnetic flux generated by the permanent magnets 54, 55, namely, the end portion of the latch magnet 11 opposing the upper permanent magnet 54 is polarized to the N pole, and the end portion of the latch magnet 11 opposing the lower permanent magnet 55 is polarized to the S pole. Therefore, the latch magnet 11 receives a lower direction force F1 from the upper permanent magnet 54, and also receives an upper direction force F2 from the lower permanent magnet 55. However, F1 and F2 are identical in amplitude but are different by 180 degrees in direction and therefore, these forces cancel each other. As a result, when the latch magnet 11 is placed in the magnetic field, it does not receive any net magnetic force from the magnetic field. Therefore, the actuator 22 maintains a stabilized attitude.

Next, operation of the actuator arm when the disk drive is in the non-operating condition will be explained.

Figure 4A:
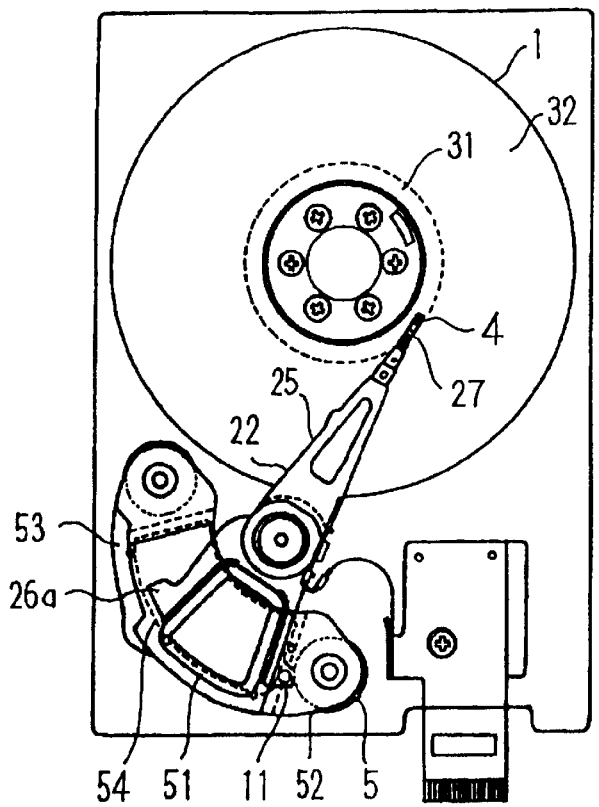
FIG. 4(a) is a plan view of the disk apparatus FIG. 2(a) in a non-operating condition.
Figure 4B:
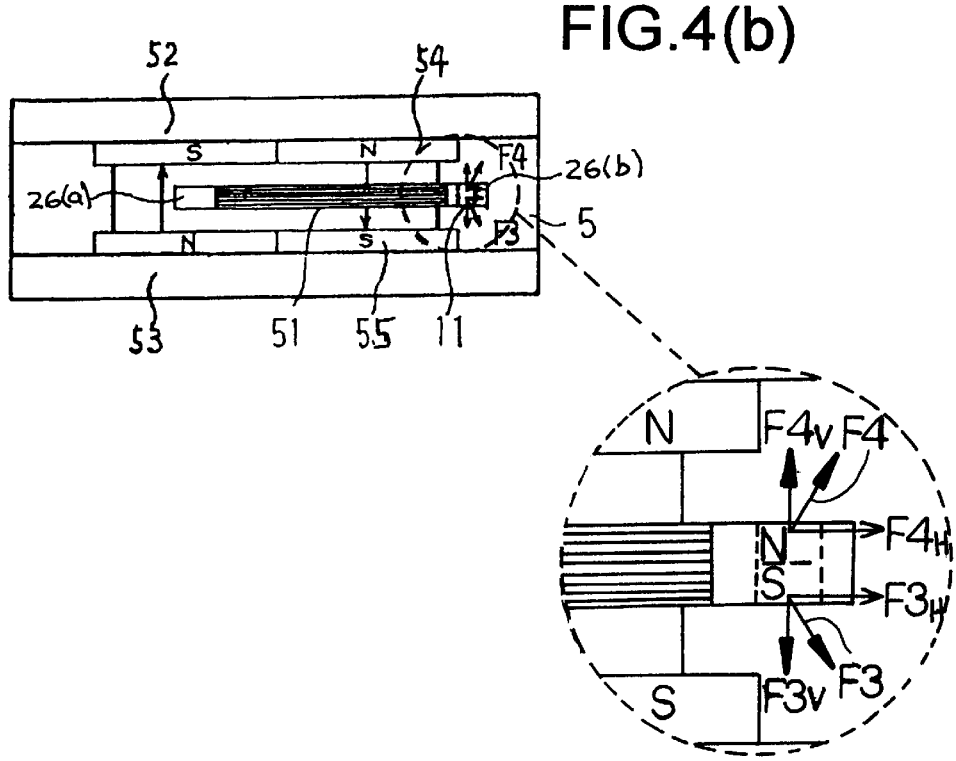
FIG. 4(b) is a back-side view of the VCM illustrated in FIG. 4(a)

When the disk drive is in the non-operating condition, the head slider 4 is located, as illustrated in the plan view of FIG. 4(a), at the position within the CSS zone 31 provided at the internal circumference of the disk 1. Moreover, the rotation of the disk 1 is stopped and the head slider 4 is in contact with the disk 1. As illustrated in FIG. 4(b), the latch magnet 11 is located at least partially outside the magnetic field generated by the permanent magnets 54, 55. The entire latch magnet 11 or only a part of the latch magnet 11 may be located outside of the magnetic field. When the latch magnet 11 is located in this position, the latch magnet 11 receives right lower diagonal force F3 from the upper permanent magnet 54, and receives a right upper diagonal force F4, which is equal in amplitude to the right lower diagonal force F3, from the lower permanent magnet 55. The forces F3 and F4 include force vectors in the vertical direction $F3_V$, $F4_V$ and the horizontal direction $F3_H$, $F4_H$. The vertical components $F3_V$, $F4_V$, of F3 and F4 effectively cancel each other and do not place rotational force on the actuator. However, the horizontal components $F3_H$, $F4_H$ are in the lateral direction between the permanent magnets. Therefore, the latch magnet 11 creates a magnetic force in the horizontal direction away from the permanent magnets 54, 55. As a result, a torque to rotate the actuator 22 is generated, and thereby the actuator 22 is activated in the counterclockwise direction in FIG. 4(a). When the actuator 22 is in contact with the stopper 5, the head slider 4 stops when it is placed on the CSS zone 31. If the disk drive receives a shock in this condition, since the actuator 22 is activated in the direction inversed or opposite from the data zone 32, the head slider 4 is prevented from moving toward the data zone 32, and thereby the data zone 32 can be protected.

According to the latch mechanism explained above, an intensified torque to latch the actuator 22 is generated by the magnetic force generated between the permanent magnets 54, 55 and thereby shock resistance can be improved. Also, since additional parts and complicated structure are not required, an intensified latch force can be obtained at a lower cost. In addition, since the latch magnet 11 does not generate torque when the disk drive is in the operating condition, the actuator 22 can be driven at a high speed.

In order to latch the actuator 22, at least a part of the latch magnet 11 must be located partially outside of the magnetic field of the permanent magnets 54, 55 when the head slider 4 is located within the CSS zone 31. Therefore, the latch magnet 11 is provided at an opposite position of the actuator 22 depending on the position of CSS zone 31. In the disk drive explained above, the CSS zone 31 is provided at the internal circumference side of the disk 1 and the latch magnet 11 is located on the outer arm 26b. The CSS zone 31 may be provided at the external circumference side of the disk 1 and in such a disk drive, the latch magnet 11 would be located on the inner arm 26a.

In the first embodiment explained above, an auxiliary mechanism may be provided to generate an intensified torque for the latching purpose. The auxiliary mechanism will be explained below with reference to FIGS. 5(a), 5(b) and FIGS. 6(a), 6(b).

Figure 5A:
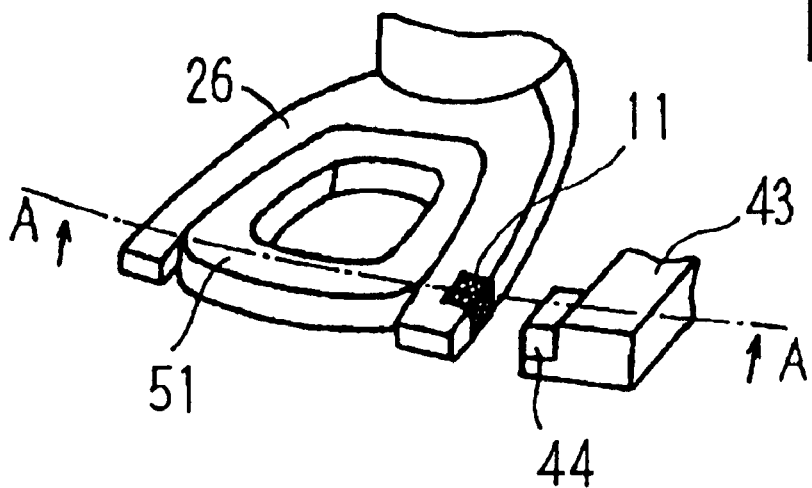
FIG. 5(a) is a perspective view of a coil arm having an auxiliary mechanism.

First, the auxiliary mechanism illustrated in FIGS. 5(a) and 5(b) will be explained. FIG. 5(a) is perspective view of the coil arm 26, while FIG. 5(b) is a cross-sectional view along the line A—A of FIG. 5(a).

On the base 42, a projection 43 integrally formed to the base 42 is provided. An iron piece 44 is also mounted on the projection 43. When the head slider 4 is located on the CSS zone 31, the distance between iron piece 44 and latch magnet 11 is such that an attracting force toward the iron piece 44 is generated on the latch magnet 11. As a result, a torque for isolating the actuator 22 from the data zone 32 is generated. According to the structure illustrated in FIGS. 5(a) and 5(b), the attracting force generated between the iron piece 44 and latch magnet 11 is added to further intensify the torque.

Figure 5B:
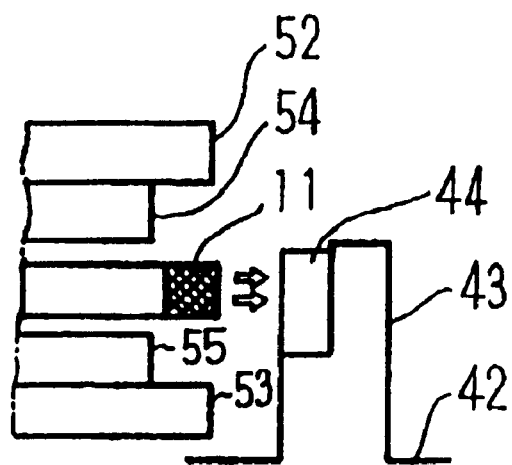
FIG. 5(b) is a cross-sectional view along the line A—A of FIG. 5(a)
Figure 6A:
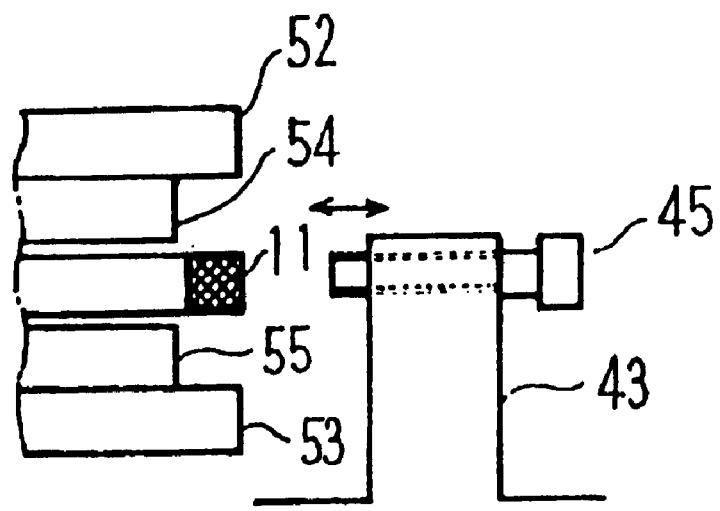
FIG. 6(a) is a cross-sectional view of an auxiliary mechanism which adjusts the stopping position by screw.
Figure 6B:
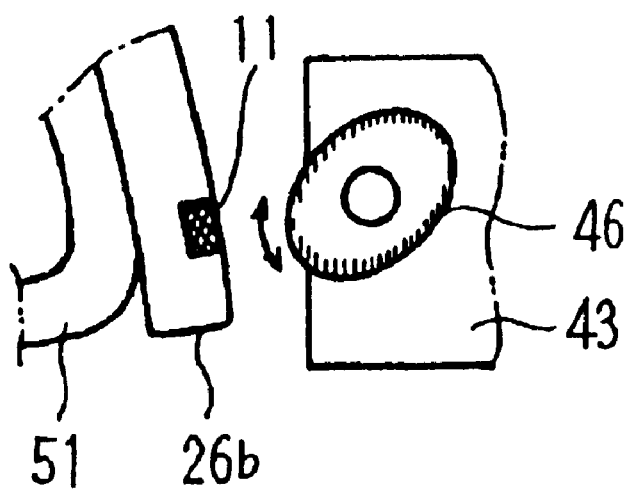
FIG. 6(b) is a plan view of an auxiliary mechanism which adjusts the stopping position with an elliptical plate.

It is also possible to provide a mechanism to adjust the torque in the auxiliary mechanism of FIGS. 5(a) and 5(b). FIGS. 6(a) and 6(b) are cross-sectional views along the line crossing the coil arm 25, illustrating auxiliary mechanisms adapted to adjust the torque.

FIG. 6(*a*) illustrates an iron screw 45 which is provided as the auxiliary mechanism to the projection 43 provided on the base 42 (not shown). The screw 45 can be moved in the direction parallel to the rotating surface of the actuator 22. Depending on the position of the screw 45, the distance between the latch magnet 11 and the end portion of the screw 45 changes, causing the magnetic force generated between the latch magnet 11 and the screw 45 to change. Therefore, the torque required to rotate the actuator 22 can be adjusted depending on the position of the screw 45.

In FIG. 6(*b*), an elliptical plate 46 formed of iron material is provided as the auxiliary mechanism at the upper surface of the projection 43 provided on the base 42 (not shown). The elliptical plate 46 is adapted to rotate about a shaft in the same direction as the rotating or swinging shaft 21 (shown in FIG. 2(*a*)) of the actuator 22. Depending on the rotating angle of the elliptical plate 46, the distance between the elliptical plate 46 and the latch magnet 11 changes, causing the magnetic force between the latch magnet 11 and the elliptical plate 46 to change. Therefore, the torque for rotating the actuator 22 can be adjusted depending on the rotating angle of the elliptical plate 46.

Figure 7A:
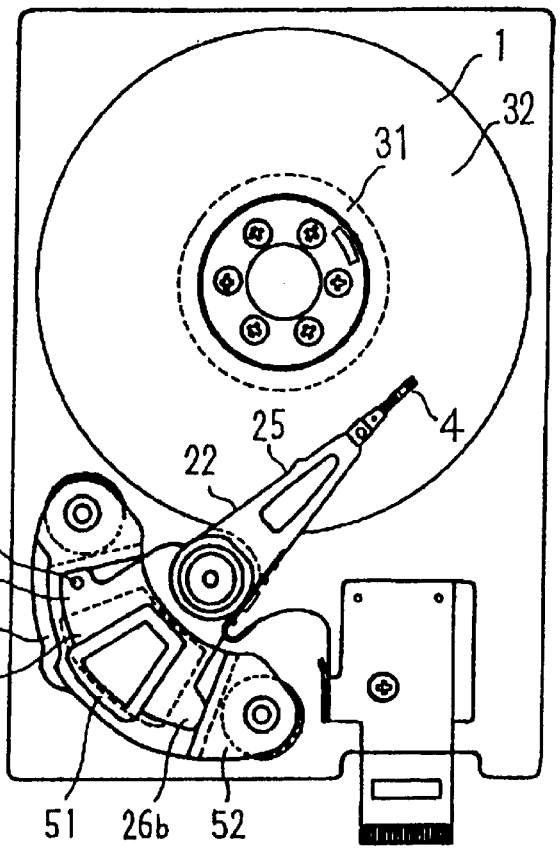
FIG. 7(a) is a plan view of a disk apparatus which has a second embodiment of the present invention shown in an operating condition.
Figure 7B:
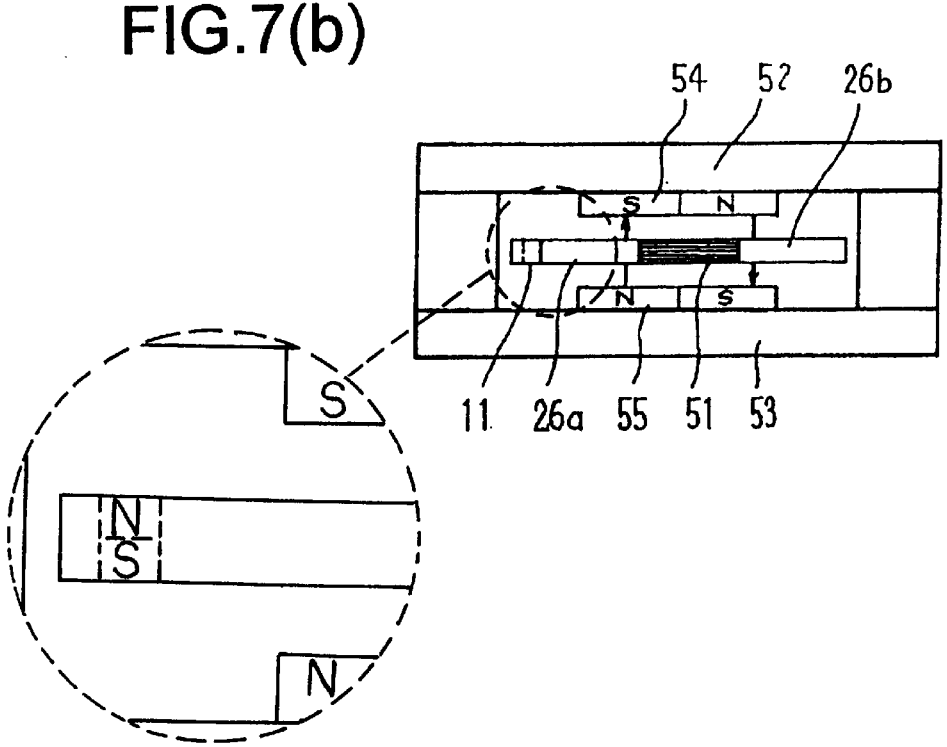
FIG. 7(b) is a back-side view of the VCM illustrated in FIG. 7(a)

FIG. 7(*a*) illustrates an actuator 22 according to the second embodiment of the present invention. In FIGS. 7(*a*) and 7(*b*), the disk drive is in the operating condition, while in FIGS. 8(*a*) and 8(*b*), the disk drive is in the non-operating condition.

In this embodiment, the direction of the magnetic flux of the latch magnet 11 is Inverted from that of the magnetic flux generated by the permanent magnets 54, 55, and the latch magnet 11 is provided on the inner arm 26*a* of the actuator 22.

First, operation of the actuator 22 when the disk drive is in the operating condition will be explained.

When the disk drive is in the operating condition, the head slider 4 is located, as illustrated in FIG. 7(*a*), on the data zone 32 of the disk 1, and the head element (not illustrated) mounted to the head slider 4 reads or writes data from or to the tracks on the data zone 32. Moreover, the head slider 4 receives air flow generated by rotation of the disk 1 causing the head slider 4 to float above the surface of the disk 1. In this case, the latch magnet 11 is placed, as illustrated in FIG. 7(*b*), outside of the area between the permanent magnets 54, 55. In this embodiment, the movable range of the actuator 22 is set so that the latch magnet 11 is not located in the area between the permanent magnets 54, 55 in both the operating or non-operating condition. The direction of the magnetic flux on the latch magnet 11 is different by 180 degrees from the magnetic flux generated by the spaced permanent magnets 54, 55. Namely, the upper end of the latch magnet 11 is polarized as the N pole, while the lower end is polarized as the S pole. Here, an attracting force is generated between the latch magnet 11 and permanent magnets 54, 55, but this attracting force may be neglected by providing sufficient distance between the latch magnet 11 and permanent magnets 54, 55.

Next, operation of the actuator 22 when the disk drive is in the nonoperating condition will be explained.

Figure 8A:
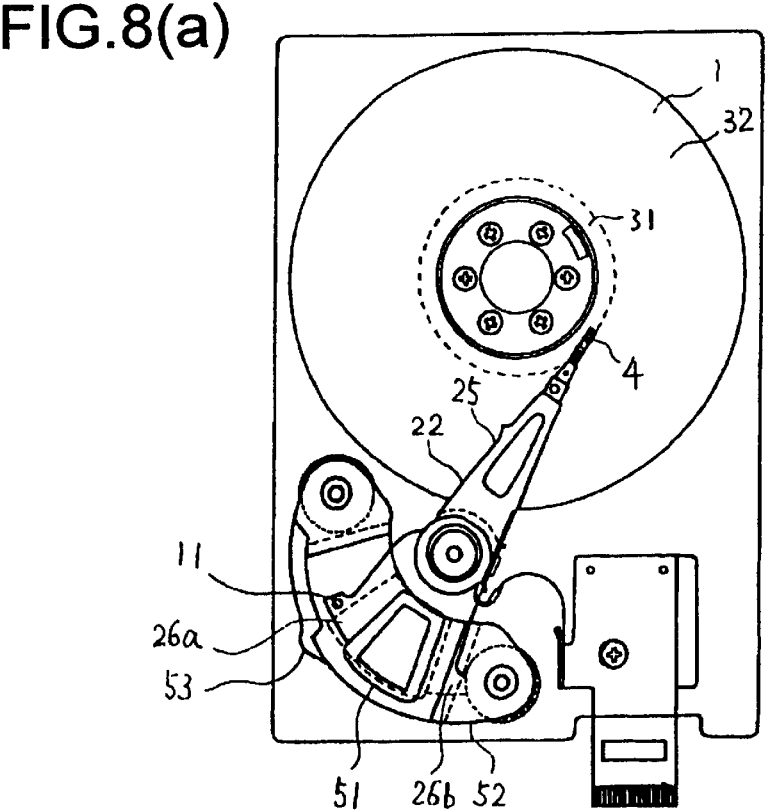
FIG. 8(a) is a plan view of the disk apparatus of FIG. 7(a) in the non-operating condition.
Figure 8B:
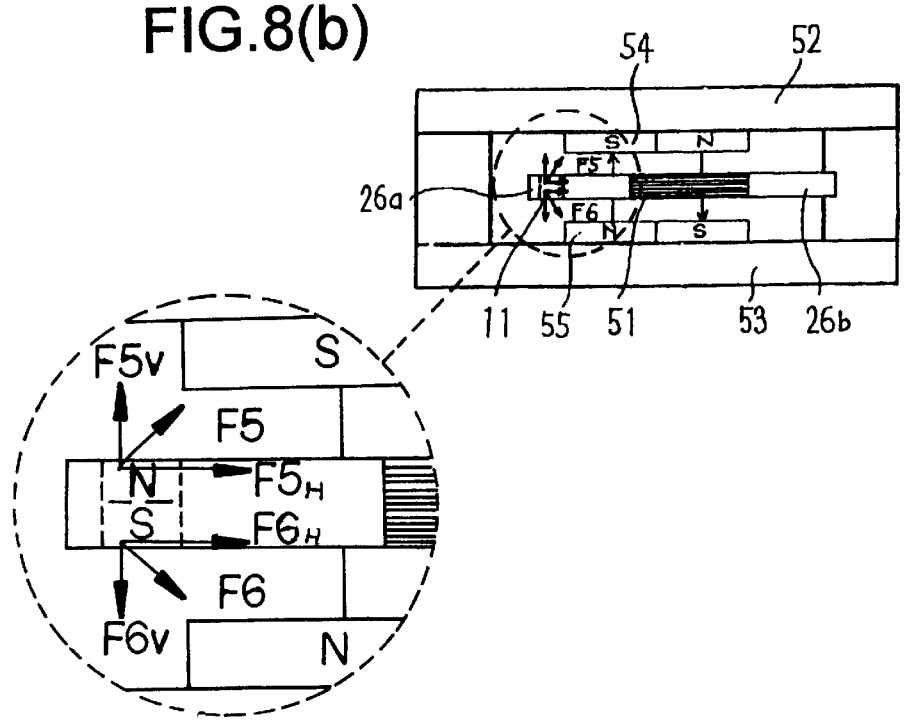
FIG. 8(b) is a back-side view of the VCM illustrated in FIG. 8(a).

When the disk drive is in the non-operating condition, the head slider 4 is located, as illustrated in FIG. 8(*a*), on the CSS zone 31 provided within the internal circumference of the disk 1. Moreover, the latch magnet 11 is most approximated, as illustrated in FIG. 8(*b*), to the magnetic field generated by the permanent magnets 54, 55. When the latch magnet 11 is located in this position, it receives a right upper diagonal-attractive force F5 from the upper permanent magnet 54, as illustrated in FIG. 8(*b*) and also a right lower diagonal-attractive force F6, which is equal in amplitude to F5 from the lower permanent magnet 55. The forces F5 and F6 can be defined in terms of their respective vertical direction elements $F5_V$, $F6_V$ and horizontal direction elements $F5_H$, $F6_H$. The vertical components $F5_V$, $F6_V$ of F5 and F6 do not move the actuator laterally. However, the horizontal elements $F5_H$, $F6_H$ of F5 and F6 do create such a force. Therefore, the latch magnet 11 is drawn by magnetic force in the horizontal direction in the direction of the permanent magnets 54, 55. As a result, a torque for latching the actuator 22 is generated and thereby the actuator 22 is activated in the clockwise direction as illustrated in FIG. 8(*a*). The actuator 22 is placed in contact with the stopper 5 and the head slider 4 stops when it is placed in the CSS zone 31. If the disk apparatus receives a shock in this condition, since the actuator 22 is activated in the direction inversed or opposite from the data zone 32, the head slider 4 is impeded from moving toward the data zone 32. Thereby, the data zone 32 can be protected.

According to this latch mechanism, first, an intensified torque for latching the actuator 22 is generated by the magnetic force generated between the permanent magnets 54, 55 and the latch magnet 11, and thereby shock resistance can be improved. Second, since additional parts and complicated structure are not required, an intensified latch force can be obtained at a low cost.

In the second embodiment, when the head slider 4 is located in the CSS zone 31, the latch magnet 11 must be close to the permanent magnets 54, 55. Even in the second embodiment, the latch magnet 11 is provided at the appropriate position of the actuator 22 depending on the position of the CSS zone 31. In the second embodiment, the CSS zone 31 is provided in the internal circumference side of the disk 1 and the latch magnet 11 is provided in the inner arm 26*a*. The CSS zone 31 may also be provided at the external or outside circumference side of the disk 1 and in such a disk apparatus, the latch magnet 11 is provided on the outer arm 26*b*.

In the present invention, the latch magnet 11 is arranged on the periphery of the magnetic field generated by the permanent magnets 54, 55. According to this structure, the rotational inertia of the actuator 22 becomes small, processing time can be curtailed and power consumption can also be reduced.

Moreover, the direction of the magnetic flux generated by the latch magnet 11 is parallel to the magnetic flux in the magnetic field generated by the permanent magnets 54, 55. Moreover, the latch magnet 11 is located outside of the magnetic field of the permanent magnets 54, 55 when the head slider 4 is located on the stop area or CSS zone 31. Thereby, an intensified magnetic force is generated between the latch magnet 11 and the permanent magnets 54, 55. As a result, an intensified latch force can be obtained and reliability is much improved. Moreover, it is no longer required to individually provide a member to attract the latch magnet 11 and the latch mechanism can be simplified. As a result, a reduction in size and a lower cost can be realized.

While the principles of the invention have been described above in connection with a specific apparatus and applications, it is to be understood that this description is made only by way of example and not as a limitation on the scope of the invention.

What is claimed is:

1. A disk apparatus comprising:
   a rotatable actuator allowing, at its one end, a head to be loaded to record or reproduce information to or from a disk medium and, at its other end, a coil;

a pair of permanent magnets arranged opposed to said coil; and a latch magnet mounted to said actuator and located on a circumference passing through the magnetic field of said permanent magnets with a rotating shaft of said actuator defined as a center, said latch magnet creating a magnetic field that is cancelled by opposite magnetic fields of said permanent magnets when said head is in a first position of the disk surface, said latch magnet magnetic field and said permanent magnet magnetic fields placing a rotational force so as to move the head toward the inner direction of the disk surface on said actuator when said head is in a second position of the disk surface defined in the inner area from said first position.

2. The disk apparatus as claimed in claim 1, wherein direction of magnetic flux in said latch magnet is parallel to the magnetic field generated by said permanent magnet when said latch magnet is in said first position.

3. The disk apparatus as claimed in claim 2, wherein said second position is in a stop area of said disk.

4. The disk apparatus as claimed in claim 3, wherein said latch magnet is provided opposed to said permanent magnet in regard to the direction parallel to the rotating shaft of said actuator when said head is in the position furthest from said stop area in the movable range thereof.

5. The disk apparatus as claimed in claim 4, wherein the direction of magnetic flux in said latch magnet is identical with the direction of the magnetic field generated by said permanent magnet approximated to said latch magnet when said head is in the stop area of said disk, said latch magnet being located with respect to said permanent magnet such that said latch magnet magnetic flux and said permanent magnet magnetic field force said head into the stop area of the disk.

6. The disk apparatus as claimed in claim 5, wherein said stop area is provided at the internal side of said disk and the latch magnet is located at the outer edge of the actuator.

7. The disk apparatus as claimed in claim 4, wherein a magnetic material is provided across from said latch magnet along an elongation of the track of said latch magnet.

8. The disk apparatus as claimed in claim 7, wherein said magnetic material is rotatably supported on an axis parallel to the rotating shaft of said actuator.

9. A disk apparatus comprising:

a rotatable actuator allowing, at its one end, a head to be loaded to record or reproduce information to or from a disk medium and, at its other end, a coil;

a permanent magnet arranged opposed to said coil; and a latch magnet mounted to said actuator and located on a circumference passing through a magnetic field of said permanent magnet with a rotating shaft of said actuator defined as a center, said latch magnet creating a magnetic field having a substantially nonactive attraction force with said magnetic field of said permanent magnet when said head is in a first position of the disk surface, said latch magnet magnetic field and said permanent magnet magnetic field placing a rotational force so as to move the head toward the inner direction of the disk surface on said actuator when said head is in a second position of the disk surface defined in the inner area from said first position.

10. The disk apparatus as claimed in claim 9, wherein the direction of magnetic flux in said latch magnet is inverted from the direction of the magnetic field of the permanent magnet approximated to said latch magnet when said head is in said second position.

11. The disk apparatus as claimed in claim 10, wherein said second position is provided at an internal side of said disk and said latch magnet is located at an inner edge of the actuator.

12. The disk apparatus as claimed in claim 11, wherein when said latch magnet is in said first position, said head is over a data zone of the disk medium, and when said latch magnet is in said second position, said head is a stop zone of the disk medium.

13. A disk apparatus comprising:

a disk medium having a data zone and a stop zone placed on an inner position from said data zone;

a rotatable actuator having a center of rotation between a first end and a second end;

said first end having a head over the disk medium for recording or reproducing information to or from the disk medium;

said second end having a coil, a permanent magnet which cooperates with the coil to rotate the actuator to move the head between the data zone and the stop zone, and a latch magnet for stopping said actuator when said head is in the stop zone, said latch magnet and said permanent magnet are configured such that a magnetic field generated by said permanent magnet neglects a magnetic field generated by said latch magnet so that the movement of the actuator is unaffected when the head is in the data zone, said permanent magnet and said latch magnet creates a magnetic field interaction that forces the actuator into a locked position when the head is in the stop zone.

* * * * *